United States Patent [19]

Gübitz et al.

[11] Patent Number: 5,208,081
[45] Date of Patent: May 4, 1993

[54] PLASTIC MOLDING HAVING A PAINTED SURFACE

[75] Inventors: Franz Gübitz, Kelkheim; Volker Ritter, deceased, late of Hünfelden-Dauborn; Ursula J. Ritter, née Zöller, legal heir, Hünfelden, all of Fed. Rep. of Germany

[73] Assignee: Hoechst Aktiengesellschaft, Frankfurt am Main, Fed. Rep. of Germany

[21] Appl. No.: 742,634

[22] Filed: Aug. 8, 1991

[30] Foreign Application Priority Data

Aug. 10, 1990 [DE] Fed. Rep. of Germany ....... 4025361

[51] Int. Cl.$^5$ .................... B60R 13/00; B32B 27/00
[52] U.S. Cl. ...................................... 428/31; 428/324; 428/325; 428/424.2; 264/171; 264/241

[58] Field of Search ....................... 428/31, 424.2, 325, 428/324

[56] References Cited

U.S. PATENT DOCUMENTS

| 4,927,675 | 5/1990 | Adams et al. | 428/35.9 |
| 5,026,448 | 6/1991 | Reafler et al. | 156/212 |
| 5,034,077 | 7/1991 | Pata | 428/31 |

*Primary Examiner*—P. C. Sluby

[57] ABSTRACT

Plastic moldings, preferably comprising a polypropylene molding composition comprising from 95 to 50 parts by weight of isotactic polypropylene or a copolymer of propylene containing up to 10% by weight of ethylene, from 5 to 50 parts by weight of rubber-like, polypropylene-compatible copolymers and from 0 to 50 parts by weight of reinforcing fillers in the underlayer, suitably colored and provided with a single-layer paint coat, are highly suitable for external applications on automobiles.

6 Claims, No Drawings

PLASTIC MOLDING HAVING A PAINTED SURFACE

Plastics are increasingly being employed in the production of motor vehicles. Impact-modified PP has proved to be particularly suitable for applications such as bumpers, spoilers, fenders, side bump strips and the like. Hitherto, these parts have been produced predominantly from UV-stabilized material which has been colored gray or black. There is now an increasing wish on the part of the automotive industry to paint moldings of this type in the color of the car or in a suitable contrasting shade. At present, this is achieved by painting the moldings, which are usually colored gray or black, with a colored paint; a finish comprising 2 to 4 layers is usual. Finishes of this type are very complex and expensive. The paint coats applied take on the functions of coloring and UV-protection of the molding.

It has now been found that this problem can be solved if a polypropylene is used which contains a rubber-like copolymer and a reinforcing filler and if the moldings are produced in colored form and are then coated with a clearcoat.

The invention thus relates to the molding mentioned in the claims which has a painted surface and to the process for its production.

This molding meets the quality requirements both of the processing industry and of the automotive industry in an excellent manner.

In its plastic underlayer, the molding comprises a) from 95 to 50 parts by weight, preferably from 90 to 70 parts by weight, of isotactic polypropylene or a copolymer of propylene containing up to 10% by weight of ethylene, b) from 15 to 50 parts by weight, preferably from 10 to 30 parts by weight, of rubber-like, polypropylene-compatible copolymers and c) from 10 to 50 parts by weight, preferably from 10 to 40 parts by weight, of reinforcing fillers.

Preference is given to a homopolymer or copolymer of propylene having a melt flow index, MFI 230/5 in accordance with DIN 53 735 of from 5 to 65 g/10 min.

Particularly suitable rubber-like copolymers are amorphous copolymers comprising 30–70% of ethylene and 70–30% by weight of propylene, terpolymers comprising ethylene, propylene and up to 5% by weight of dienes, preferably ethylidenenorbornene or 1,4-hexadiene, copolymers comprising ethylene and from 10 to 45% by weight of vinyl acetate, or block copolymers comprising styrene and butadiene or styrene and isoprene which have polystyrene blocks at both ends of the molecule.

Preferred reinforcing fillers are talc, chalk, mica, glass fibers or glass beads.

For use in automobile manufacture, in particular as bumpers, spoilers and the like mounted externally on the automobile, the molding according to the invention contains colored pigments in the underlayer. In addition, the underlayer contains the conventional additives, such as, for example, stabilizers.

The surface of the molding may be smooth or textured.

It is painted with a polyurethane paint, preferably a two-component system comprising an NCO prepolymer and a polyhydroxyl compound. The NCO prepolymer is predominantly derived from diisocyanatodiphenylmethane (=MDI), and the polyhydroxyl compound is preferably a polyester-polyol, polyether-polyol, epoxy resin, polychloroprene resin or silicone resin. In addition, the paint contains an adhesion promoter, for example a chlorinated polyolefin containing from 15 to 50% by weight of chlorine, if desired mixed with an ethylenevinyl acetate copolymer, an amorphous propylene grade which has been modified with a carboxylic acid or carboxylic anhydride, a sulfonated or sulfochlorinated amorphous polypropylene or a mixture of amorphous polypropylene and a styrene polymer, polyamide or polyalkyleneimine. This paint adheres to the molding underlayer to be used according to the invention without physical or chemical pretreatment.

If specific optical effects, for example pearlescent effects, are to be achieved, a metallic pigment or pearlescent pigment (for example colored mica) can be added to the paint. The amount added is generally from 0.01 to 1.0% by weight.

The plastic molding according to the invention preferably contains a single-layer paint coat which adheres strongly to the surface.

The process according to the invention has the advantage over the known procedure that in general only a single paint coat is applied, providing both UV protection and, if desired, also optical effects; this effectively reduces the complexity in the production of painted plastic moldings.

The combination of colored substrate with a clear or only slightly modified paint coat makes it possible to achieve novel optical effects and ones which were hitherto impossible to achieve in practice by traditional means.

EXAMPLE 1

55% by weight of stabilized, isotactic polypropylene (MFI 230/5=18 g/10 min), 25% by weight of amorphous ethylene propylene copolymer (55% by weight $C_2$, 45% by weight $C_3$) and 20% by weight of talc were mixed and colored in a blue shade. This mixture was injection molded to produce a bumper, which was painted with a two-component polyurethane clearcoat containing 62% by weight of binder, 8% by weight of adhesion promoter (chlorinated amorphous polypropylene) and 0.1% by weight of metallic pigment, and the coating was dried for 20 minutes at 100° C.

The following data were measured on the painted bumper:

| | |
|---|---|
| DIN 53151 crosshatch test: | Gt 0-1 |
| DIN 50017 or 53209 condensed moisture test (constant ambient conditions) and crosshatch test: | Gt 0-1 |
| Mercedes Benz standard DBL 5416 steam-jet test: | passed |

EXAMPLE 2

50% by weight of stabilized isotactic polypropylene (MFI 230/5=65 g/10 min), 30% by weight of amorphous ethylene-propylene copolymer (55% by weight $C_2$, 45% by weight $C_3$) and 20% by weight chalk were colored beige and additionally provided with 0.5% by weight of a commercially available UV absorbent.

This mixture was injection molded to produce a radiator grill, which was subsequently painted with a paint as described in Example 1. Instead of the metallic pigment, 0.05% by weight of a pearlescent pigment had been admixed with this paint. The test and assessment were analogous to Example 1 and gave the same results.

EXAMPLE 3

65% by weight of stabilized isotactic polyypropylene (MFI 230/2=0.2-0.3 g/10min) and 35% by weight of amorphous ethylene-propylene copolymer were colored in a red shade and additionally provided with 0.5% by weight of UV absorbent.

This mixture was extrusion blow molded to produce a rear spoiler, which was painted with a paint as described in Example 1 (but without addition of metallic or pearlescent pigment). The same results were achieved as in Example 1.

We claim:

1. A molded plastic article having a painted surface, said article comprising:
   a molded, colored plastic mass, said molded, colored plastic mass comprising:
   a) from 95 to 50 parts by weight of isotactic polypropylene or a copolymer of propylene containing up to 10% by weight of ethylene,
   b) from 5 to 50 parts by weight of an amorphous, rubber-like, polypropylene-compatible copolymer comprising 30-70% by weight of ethylene and 70-30% by weight of propylene or a terpolyemr comprising ethylene, propylene and up to 5% by weight of a diene, and
   c) from 0 to 50 parts by weight of a reinforcing filler;
   a clearcoat paint coating adherently coated on a surface of said molded, colored plastic mass, said clearcoat paint coating having been coated onto said surface of said molded plastic article without physical or chemical pretreatment of said surface, said clearcoat paint coating being substantially a single layer and containing an adhesion promoter.

2. A plastic article as claimed in clam 1, wherein said clearcoat paint coating comprises a polyurethane binder, a polyolefin-containing adhesion promoter, and, optionally, a metallic or pearlescent pigment.

3. An automobile part consisting essentially of the molded article of claim 1.

4. A molded plastic article having a painted surface, said article comprising:
   a molded, colored plastic mass, said molded, colored plastic mass comprising:
   a) from 95 to 50 parts by weight of iostactic polypropylene or a copolymer of propylene containing up to 10% by weight of ethylene,
   b) from 5 to 50 parts by weight of an amorphous, rubber-like, polypropylene-compatible copolymer comprising 30-70% by weight of ethylene and 70-30% by weight of propylene or a terpolymer comprising ethylene, propylene and up to 5% by weight of a diene, and
   c) as reinforcing filler, an effective amount, up to 50 parts by weight, of talc, chalk, mica, glass fibers or glass beads;
   a clearcoat paint coating adherently coated on a surface of said molded, colored plastic mass, said clearcoat paint coating having been coated onto said surface of said molded plastic article without physical or chemical pretreatment of said surface, said clearcoat paint coating being substantially a single layer and containing an adhesion promoter.

5. A plastic article as claimed in claim 4, wherein said clearcoat paint coating comprises a polyurethane binder, a polyolefin-containing adhesion promoter, and, optionally, a metallic or pearlescent pigment.

6. An automobile part consisting essentially of the molded article of claim 4.

* * * * *